Patented May 13, 1952

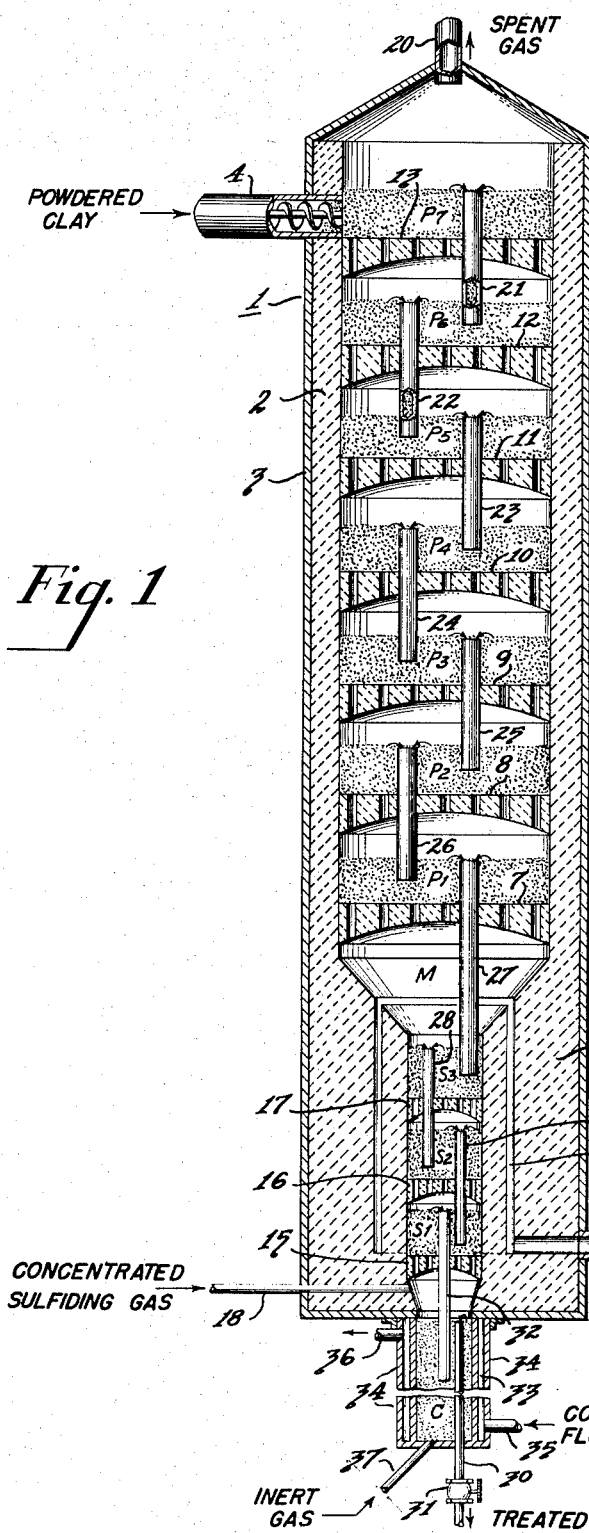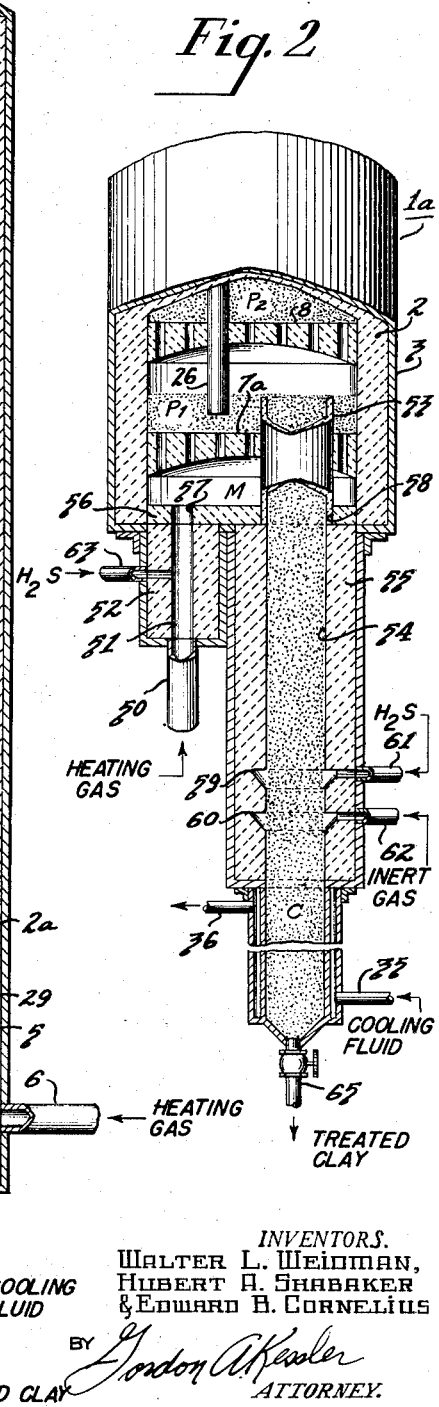

2,596,611

UNITED STATES PATENT OFFICE 2,596,611

CHEMICAL TREATMENT OF FINELY DIVIDED SOLIDS

Walter L. Weidman, Woodbury, N. J., and Hubert A. Shabaker, Media, and Edward B. Cornelius, Swarthmore, Pa., assignors to Houdry Process Corporation, Wilmington, Del., a corporation of Delaware Application April 7, 1948, Serial No. 19,456

5 Claims. (Cl. 252—439)

The present invention relates to improved methods for chemical treatment of solid materials such as clay and other minerals in finely divided or powdered form with gaseous materials which react therewith or with components thereof. One of its particularly valuable applications is the treatment of finely divided or powdered clay and other mineral products by methods including sulfidation, for example, in the preparation of modified powder products of the type particularly useful as or in catalysts for hydrocarbon conversion operations.

In copending applications Serial Nos. 644,423 and 644,426 (filed January 30, 1947 jointly in the names of Hubert A. Shabaker, George Alexander Mills and Ruth C. Denison, now issued respectively as U. S. Patents Numbers 2,466,048 and 2,466,051) methods are described for the production of modified clay masses providing catalysts of unique properties, by treatment of iron-containing clays with sulfiding gases at elevated temperature followed by the removal of the iron sulfide thus formed. The novel contact masses thus obtained are changed in physical and chemical properties and demonstrate important advantages as catalysts, including exceptional stability in cracking and in treating petroleum stocks of high sulfur content.

In a copending application of Hubert A. Shabaker, Serial No. 6,722, filed February 6, 1948, certain improved methods for sulfidation of solid materials are described employing a treatment of at least two stages, wherein in an initial stage the material, such as clay or other mineral, is heated to desired high temperature for the sulfidation reaction by contact with an essentially inert gaseous medium carrying a comparatively small quantity of active gaseous sulfide, such as $H_2S$ or $CS_2$, the thus heated and partially sulfided clay being subsequently contacted for a comparatively short time with concentrated sulfiding gas to perfect or assure completion of the sulfiding reaction. The sulfided clay is subsequently cooled and subjected to acid-leaching, principally effecting thereby removal of the iron sulfides formed. By this operation efficient and uniform sulfiding of the clay is obtained using only fairly small amounts of active sulfiding gas for reaction with the iron content of the clay, affording, among other advantages, the best economy in the use of the sulfiding gas. The resulting sulfided clays are capable of being easily leached with acid to provide modified clay products of low iron content and of uniformly high and stable catalytic activity.

One specific procedure described in said last named copending application involves movement of the solid material downwardly and countercurrently to the treating gas in each of several treating stages. That particular procedure offers its greatest versatility and flexibility when the individual particles of solid are of relatively high mass, especially when they are relatively coarse, for example, granular or molded. Somewhat less versatility and flexibility, particularly with respect to the ratios of gaseous or solid materials are realized when the gravitating solid material is in finely divided or powdered form.

Another method for contacting finely divided or powdered solid with gases or vapors involves passage of the gas phase through a mass of the solid under such conditions including velocity that the solid is fluidized, that is, maintained in relatively dense form and turbulent suspension within the gas. In counter-current flow systems such as that mentioned above where the temperature of the downwardly flowing solid gradually approaches the inlet temperature of the upwardly flowing gases, and, when sufficient contact is provided, these temperatures become substantially the same at the lower end of the treating vessel. In contra distinction to this desirable feature of counter-current flow, when gas and finely divided solid at different temperature levels are brought together to form a fluidized mass, layer or bed, the mixing and heat exchange results in a suspension or mixture at equilibrium temperature intermediate that of the entering gaseous and solid components. In reaching this equilibrium temperature certain portions of the powdered solid reach temperatures above that equilibrium level. The greater the extent to which the temperatures of the solid is changed, the greater is the difference between the equilibrium and gas temperatures. When treating temperatures are high, as of the order of 1000 to 1500° F., supply of the still hotter treating gas involves major problems of design and operation of heating equipment therefor. Moreover, because of the turbulent nature of fluidized masses certain of the powdered material remains within the treating zone for longer than the average solid residence time.

It is thus apparent that in treatment with hot gases of relatively cool solids whose desired catalytic or other adsorptive properties are impaired or destroyed by excessive temperatures and by residence for prolonged or uncontrolled periods at such temperatures, as is the case with clays and other minerals, the fluidized bed technique presents inherent disadvantages. These disadvantages or difficulties are minimized or even overcome by utilization of a unique multi-stage process and system with which the present invention is concerned.

In practice of the present invention sulfidation of finely divided solid materials such as iron-containing clays and other minerals, is effected by heating the solid material to desired or optimum reaction temperature range in a plurality of separate heating stages of successively increased temperature, the solid material being maintained by suspension in heating and treating gas as a dense turbulent fluidized mass, which gas enters each stage at a temperature higher than that of the solid material entering that stage. The heating and treating gas thus utilized contains in dilute concentration therein active sulfiding gas so that while bringing the solid material to desired maximum reaction temperature, at least partial sulfidation of the solid material is initiated to desired extent. In accordance with a preferred aspect of the invention, the hot sulfided solid material is further contacted with cooler concentrated sulfiding gas for a relatively short time to perfect or complete the sulfidation of any possible material not fully reacted in the previous operation, thereby assuring uniformity of treatment without unduly prolonging the reaction time, and thereby utilizing the capacity of the equipment to best advantage.

In the preparation of finely divided or powdered modified clay products of low iron content, and of improved catalytic properties, which is one of the principal purposes of the invention, temperatures in the order of 1200–1500° F., preferably from about 1300–1450° F., are employed, and the sulfided clay is ultimately treated, as with dilute mineral acid, to remove the formed iron sulfides. A preferred acid treatment comprises the use of aqueous mineral acid of 5 to 15% concentration over a period of 8 to 24 hours or more at room temperature or above, as up to about 180° F.

The novel features of the invention are not limited in their application to sulfidation reactions, but can be advantageously employed in other operations wherein finely divided solid materials are reacted with gaseous fluids at elevated temperatures, particularly in instances where the reaction temperatures desirably employed must be carefully controlled to avoid any detrimental effects of overheating the material. Processes involving chlorination of mineral materials such as iron containing clays and the etching of siliceous mineral materials with corrosive gases such as hydrogen fluoride are noteworthy examples.

The invention will be more clearly understood from the description which follows read in connection with the accompanying drawings illustrating typical arrangements of continuous treaters adapted for use in practice of the invention. Figure 1 is a view of such a treater in vertical cross section, and Figure 2 is a partial view of a modification thereof.

To simplify description of the principle of operation, the apparatus is hereinafter described in connection with its use in sulfidation of finely divided clays or other iron containing minerals, although it will be understood that the invention is not to be construed as limited thereby.

In the illustrated embodiment of Figure 1, there is shown generally an upright chamber or reactor 1 which is preferably cylindrical at its upper section formed by the lateral wall 2, but may be of other desired shapes. The wall 2, because of the high temperature of the sulfide or other corrosive gas in this section is preferably formed of a ceramic material or other corrosion-resistant and insulating material at least throughout that section of its length coming into contact with high temperature corrosive gas, as at temperatures above about 900° F. For reinforcing the structure, a shell of metal or other suitable material of construction may be employed outside of the wall 2, as illustrated at 3.

The finely divided clay or other solid material to be treated is introduced into the reactor at the top thereof by suitable conveying means which may comprise, as shown, a screw conveyor 4 fed from any suitable source of supply (not shown) as a bin, hopper, pneumatic conveyor or the like communicating with the inlet of conveyor 4.

At its lower section the wall 2 is flared inwardly to provide a thickened wall portion $2a$. An annular slot 5 of suitable length, as will be hereinafter more fully explained, is provided in the thickened wall portion $2a$. This slot provides a channel which communicates with a feed line 6, through which the heating gas is introduced into the reactor, said gas flowing upwardly through the annular slot 5 to a mixing zone M below the primary treating section. The primary treating section is divided into separated treating zones $P_1$ through $P_7$ by horizontal perforated partitions such as shown at 7, 8, 9, 10, 11, 12 and 13, which partitions are also preferably formed of ceramic or other material resistant to the sulfiding gas at elevated temperature. The number of such partitions will be governed by the size of the unit and the desired temperature gradient within the reactor.

Below the inwardly flared portion of the wall 2 and extending through substantially its entire length, the thickened wall portion forms the lateral wall of the secondary treating section which is likewise divided into separate treating zones as $S_1$, $S_2$, $S_3$; by horizontal partitions 15, 16 and 17, which desirably are also formed of ceramic material. Concentrated sulfiding gas containing for instance $H_2S$ or $CS_2$, is introduced into the secondary treating section and below $S_1$, by a line such as is shown at 18, the gas passing upwardly through the perforated partitions 15, 16 and 17 and entering thereabove the mixing zone M where it admixes with the hot gas introduced through line 6 and annular slot 5. The mixture of the concentrated gas with the hot gas thus formed in the mixing zone M, passes upwardly through the perforated partitions 7, 8, 9, 10, 11, 12, and 13 to be discharged through a conduit as shown at 20, which may be provided with means for separating out entrained solid materials (not shown) such as electrostatic precipitators or cyclones. The number of partitions in the lower section may also be varied in relation to the extent of the secondary treatment required or employed.

The finely divided clay or other mineral in each of the zones above the respective horizontal partitions hereinbefore described is fluidized by the gases passing through the supporting perforated partitions and in this fluidized state is heated by direct exchange with the hot gas and is sulfided by the gaseous sulfide component of such gas. As a result of continuous addition of starting solid material by the conveyor 4, the level of the fluidized bed above the partition 13 will be raised to above the height of the vertical conduit 21 passing through such partition. Solid materials from the upper level of the bed will therefore overflow into the conduit 21 and downwardly therethrough to form a layer above the partition 12 at the next lower level, which layer will similarly be fluidized by entering gases flowing upwardly through the partition 12 and again overflow above the upper level of the layer into a similar conduit 22, and so forth; the solid material thus passing downwardly from layer to layer in the primary treating section through the respective conduits 23, 24, 25, 26 and 27.

Above the partition 17 in the secondary treating section, the already heated and partially treated material discharging from conduit 27 into zone S3 will similarly be fluidized by entering gas therein and with continuous addition of solids will overflow into the next succeeding zones S2 and S1 by conduits 28 and 29 respectively. The solid material in the respective layers above the partitions 15 and 16 in turn being maintained in fluidized state by the gases passing upwardly through said partitions. In the manner described accordingly, the solid material will have been heated and treated in passing in contact and in countercurrent relation with the several upwardly flowing introduced gases.

The treated solid material is ultimately discharged through a conduit 30 provided with a gate valve or suitable flow control means as shown at 31, by overflowing above the partition 15 through a conduit 32 into a cooling section C and from said cooling section by overflow into the conduit 30 which extends upwardly above the lower terminus of the conduit 32. Cooling is effected by indirect heat exchange or other known means such as by the provision of a liquid containing jacket in the space between the walls 33 and 34 through which space water or other desired cooling fluid is circulated in known manner as by lines 35 and 36.

To prevent discharge of sulfide gas with the solid materials through conduit 30 and to assure upward flow of the concentrated sulfide gas introduced through line 18, an inert seal gas is introduced at the bottom of the cooling section C, as by means of a line 37, at a pressure slightly above that present at the point of introduction of the concentrated sulfiding gas through line 18, thereby opposing downward flow of the sulfiding gas. Only small volumes of seal gas are required as in the order of 1 to 2% of the volumetric rate at which the heating gas is introduced through line 6.

In the modified embodiment illustrated in Figure 2, the admixture of the concentrated sulfiding gas and the introduced heating gas takes place within the zone P1 of the primary treating section. The heating gas is introduced through a line 50 communicating with a channel or conduit 51 provided or formed in a ceramic block 52 extending from the reactor 1a below the partition 7a, which block may be reinforced by an outer metallic shell, as shown, formed integrally with or securely attached to the shell 3.

In the modified embodiment as illustrated in Figure 2, the solid material overflowing from zone P1 enters a conduit 53. This conduit is formed of corrosion resistant material and is of suitable diameter for handling a sufficient volume of concentrated treating gas without necessitating gas flow rates at high enough velocities to prevent gravitation of solid materials through the conduit counter to the upwardly flowing gas therein introduced as hereinafter described. The conduit 53 is contiguous with a channel 54 formed in a ceramic block 55, the channel being preferably of the same internal diameter as the conduit. A reinforcing shell is provided for the block 55 integral with or suitably secured to the shell 3. A ceramic liner 56 is provided at the bottom of the reactor 1a which liner has therein a suitable opening as at 57 for admission of gas into the reactor from conduit 51 as well as an opening at 58 communicating with the conduit 53 and the channel 54.

The ceramic block 55 is cut in as shown at 59 and 60 to provide annular gas intake channels in direct communication with and surrounding the channel 54. Concentrated sulfide gas is introduced into the annular channel 59 by means of a connecting feed line 61. An inert gas, operating as a seal gas, is introduced through line 62 at a slightly higher pressure to direct upward flow of gas through the channel 54 and conduit 53. The lower edges of the cut away portions at 59 and 60 are at a sufficiently steep angle to overcome any tendency of flowing solids to repose thereon.

The rate of flow of the gases in channel 54 is such as to provide hindered settling of the solid material descending through such channel. The quantity of sulfiding gas that can be introduced into the channel 54 as through line 61, under these conditions is substantially less than that which can be employed in the alternate construction illustrated in Figure 1. In using the embodiment of Figure 2, accordingly, it is recommended that a larger quantity of active sulfide gas be admitted with the heating gas entering through line 50, so that the active sulfide gas is in sufficient concentration to provide within the primary treating section an amount of such sulfide several times the equivalent of the theoretical iron content of the clay fed thereto. The sulfide gas may be admitted through a line 63 in communication with channel 51 through which the heating gas is flowing.

The sulfided material is further cooled by continuously being discharged from the channel 54 into a cooling section C similar to that shown in the embodiment of Figure 1. The cooled product is discharged from the cooling zone through a conduit provided with a gate valve or other suitable flow control means as shown at 65.

In the apparatus thus far described, and other types of apparatus that may be substituted, provision is thus made for securing the desired mixture of sulfiding gas and heated carrier gas constituting the dilute treating gas for the first stage treatment, as a result of the flow or diffusion of a portion of the concentrated sulfide gas from the latter treating stage; the construction being such as to minimize channelling of gas. It is preferred in practice, however, even with the use of the embodiment of Figure 1 to further assure sulfidation of the clay uniformly across the transverse section of the reactor, to add at least a small portion of sulfide gas with the hot carrier gas directly introduced into the reactor in the first stage; for example, by admission of the carrier gas together with the desired portion of sulfiding gas through line 6 in the illustrated apparatus.

The concentrated sulfide gas introduced in the second stage, need not be at a high temperature. Since the clay is already heated to required temperature as a result of the first stage treatment, and only small amounts of total gas and a comparatively short time of treatment employed for the second stage, the concentrated gas may be introduced at ordinary temperature, including room temperature or lower. In fact, reduction in temperature of the clay during the second stage sulfidation treatment may be advantageous from the standpoint of assisting cooling thereof.

The heating gas serving also as the carrier gas for the dilution of the $H_2S$, $CS_2$, or other active sulfiding gas or vapor, must be essentially inert; that is, it must be free from other constituents in amounts which would interfere with the sulfidation reaction or be harmful to the clay or the catalyst prepared therefrom. Commercial nitrogen is an example of a gas substantially fulfilling these requirements.

Another essentially inert heat carrier gas, which is comparatively cheap and readily made available, is a specially processed or prepared flue gas, which may be obtained for instance by the controlled combustion of a fuel. Gaseous fuels are preferred because of easier control of combustion; examples of such gaseous fuels which may be burned to provide flue gas, include propane, and domestic heating gas. Such flue gases from commercial propane, for instance, can be readily prepared free of oxygen, but would then contain components such as water vapor, $CO_2$, and generally small amounts of CO and $H_2$ in addition to nitrogen.

Although in a single stage treatment employing dilute sulfide gas, the quantity of carbon dioxide that may be present in the carrier gas is limited because of the adverse effect of large quantities of carbon dioxide on the sulfidation reaction and on the subsequent facility of leaching of the clay, in following the two stage treatment of the present invention and employing a final treatment with concentrated sulfiding gas, such adverse effect of substantial quantities of $CO_2$ is considerably reduced or substantially eliminated. Effective sulfiding followed by good acid leaching can be obtained by initial treatment with flue gas compositions containing 12 to 15% or more (by volume) $CO_2$ and only very small concentrations of sulfide gas, in the order of 0.5% to 1% $H_2S$ (of the total volume of treating gas), followed by treatment of the clay for a short period in more concentrated sulfide gas containing from about 25 to 100% sulfide by volume of total concentrated treating gas. The total quantity of sulfide employed need be only in slight excess of the theoretical equivalent of the iron content of the clay, but is preferably several times the equivalent.

During the first stage treatment wherein the clay or other finely divided mineral material is being heated to desired reaction temperature, comparatively large amounts of heating gas are required. The rate of admission of heating gas has no noticeable effect on the sulfidation reaction, provided it is high enough to effect fluidization of the several catalyst beds of the series and provides sufficient heat to bring the solid materials to desired reaction temperature. After the solid material has been heated to the desired temperature for sulfidation, only about one half hour or less may be required for obtaining complete reaction with the iron content of the clay; nevertheless, it will often be found advantageous to retain the clay within about 100° F. of maximum temperature attained for at least one hour and preferably for about 2 to 5 hours before subjecting the clay to the final cleanup treatment with the concentrated sulfiding gas. Extending the time of treatment beyond the indicated time, has not been found to provide any particular advantage; nor, on the other hand, has any detrimental effect been noted. The treatment with the concentrated sulfide gas in the secondary or cleanup section need be conducted for only a comparatively short time as in the order of only several minutes. Even with concentrations of sulfide gas as low as about 25%, no particular advantage appears for extending the residence time of the solid materials in the secondary treating section beyond about 10 to 30 minutes.

The dimensions of the reactor and the relative size and number of beds in the primary and secondary treating sections as well as the rate and volume of admission of the several gases, it will be understood, will be controlled by the indicated time factors correlated with the quantity of material being handled. Also depending upon the degree of improvement sought and the nature of the starting material, more or less than the illustrated number of beds may be provided in the primary as well as in the secondary treating sections.

The following example is illustrative of a practical operation of the invention employing the illustrated apparatus of Figure 1. An acid activated sub-bentonite montmorillonite clay, Super Filtrol, (containing about 2.0% by weight $Fe_2O_3$ on a calcined clay basis), is furnished in finely divided form by milling or crushing and screening to desired size, as that having a particle size designed for use in conducting operations employing fluidized bed technique (as of about 50 to 300 mesh average particle size). The heating or carrier gas, which is also used as the seal gas in this instance, is a flue gas obtained by drying the combustion product of propane burned in air under controlled conditions to obtain a composition substantially free of oxygen. This composition dried to contain only a trace of water, typically contains 13.1 volume percent $CO_2$, 1.0% $H_2$ and 1.7% CO. A flue gas of this composition has a calculated density of about .078 lb. per cu. ft. at room temperature (60° F.) and an average molecular weight of about 29.6.

The inert carrier gas is introduced through line 6 at a temperature of approximately 1450° F. and at a rate of about 1.3 to 1.4 lbs. of gas per lb. of clay introduced per hour corresponding to 16.7 to 18 cu. ft. of such gas per hour (60° F.). The portion of the flue gas admitted through line 37 to operate as seal gas, constitutes about 1 to 2% of the volumetric rate at which the heating gas is introduced through line 6. The total quantity of sulfiding gas employed is in excess of the stoichiometric equivalent of the iron content of the clay or on a weight for weight basis, about 1.82 lbs. of hydrogen sulfide per lb. of iron compounds contained in the clay, calculated as $Fe_2O_3$. This quantity of hydrogen sulfide is provided by the use of 100% $H_2S$ admitted through line 18 at a rate to provide equal volumes of inert gas and sulfiding gas in the zone immediately below partition 15, forming a sulfiding gas of 50% volume concentration which passes through the several beds in the secondary treating section comprised of the fluidized beds below mixing zone M. A small amount of hydrogen sulfide comprising 1 to 2% by volume of the inert gas is introduced also directly into the first treating stage in admixture with the hot inert gas through line 6 and annular slot 5.

At the flow rates indicated in this example, the residence time of the sulfide material in each of the series of beds constituting the primary treating section is about 1.6 hours. Seven such beds being employed, the total residence time in the primary treating section during which the clay is heated to required temperature and initially sulfided amounts to about 11.2 hours. The size of the secondary treating section is such as to provide a total of about 0.5 hour for passage of the solid material through the three beds of the illustrated embodiment; constituting about 0.17 hour residence time in each bed. In the cooling zone the clay is cooled to desired discharge temperature below about 800–1000° F.

Following discharge from the cooling section of the treater, the clay is further cooled to required temperature for acid treatment, which treatment is carried out, in this instance, at room temperature employing dilute mineral acid such as 15% aqueous hydrochloric acid for a period of 24 hours, the acid being changed once during the treating period. Subsequent washing with water and drying completes the operation. In this manner there are obtained contact masses of improved catalytic properties having about 0.1% or less by weight of total iron compounds calculated as $Fe_2O_3$.

If it is desired to calcine the obtained modified clay and stabilize the catalytic activity thereof before charging the same to a hydrocarbon conversion operation, this may be accomplished by treatment at temperature above about 800° F. in air, steam, or mixtures of these, employing one or more fluidized beds of the type already described for the initial sulfiding operation.

In the illustrated embodiment it will be seen, that heating of the clay is effected by direct exchange with the introduced heating gas, the temperature of the clay progressively increasing from room temperature (as it is introduced into the reactor by conveyor means 4) to about 1400° F. (in the lowermost section of the primary treating section), while the gas entering through line 6 is progressively cooled in passing upwardly from zone to zone from its initial temperature of about 1450° F. to about 680° F. at its point of discharge. The various temperature changes undergone by the clay and gas are illustrated by the following table:

*In primary stage zones*

| Zone No. | Zone Temp. °F. | Gas Entering Zone °F. | Clay Entering Zone °F. |
| --- | --- | --- | --- |
| P1 | 1,400 | 1,450 | 1,325 |
| P2 | 1,325 | 1,400 | 1,190 |
| P3 | 1,190 | 1,325 | 1,070 |
| P4 | 1,070 | 1,190 | 910 |
| P5 | 910 | 1,070 | 680 |
| P6 | 680 | 910 | 390 |
| P7 | 390 | 680 | Atmospheric |

*In secondary stage zones*

| | °F. |
| --- | --- |
| S3 | 1400 |
| S2 (approx.) | 1390 |
| S1 (approx.) | 1360 |

*In cooling and seal stage zone*

| | °F. |
| --- | --- |
| C1 | 800–1000 |

With the type of clay in the example, although lower maximum temperatures can be employed, for the production of catalysts of lowest residual iron content and maximum catalytic activity, sulfidation at about 1350–1400° F. is recommended.

It will be understood that the seal gas need not necessarily be of the same composition as the heating gas, but the use of the same composition adds to the simplicity of the operation. The desired concentration of sulfiding gas in the secondary treating section is obtained by dilution of 100% or other concentrations of sulfide gas introduced through line 18 with the required quantity of seal gas introduced through line 37.

To obtain good sulfiding action and ready removal by mild acid leaching of the formed iron sulfide, the treating gases should be substantially free from uncombined oxygen and from water. A maximum moisture content of 0.2 volume percent of the described flue gas used as a diluent and heating gas is readily obtained by passing such gas over a dessicant such as silica gel.

In the preferred operation hereinbefore described, the concentrated sulfide gas from the secondary treating section is permitted to enter the primary treating section for use therein. It will be apparent, that if desired, this gas may be vented from the reactor, and all of the desired concentration of sulfide gas separately furnished for the primary treatment.

In the described manner, iron-containing clay or other mineral is heated up to required reaction temperature and most, if not all, of the iron content thereof is reacted in the primary treatment during contact with comparatively large volumes of dilute sulfiding and heating gas. The use of such large volumes of gas at the outset of the treatment also serves to rapidly flush from the clay or other mineral, undesirable reaction or calcination products, thereby avoiding or minimizing adverse effects on the treated product and the thus sulfided product may then be subjected to further sulfidation during a secondary stage of treatment with excellent results, employing only a comparatively small volume of concentrated sulfiding gas. This subsequent treatment with the concentrated sulfiding gas provides a "cleanup" or equalizing step insuring complete sulfidation of the iron content of the clay or like and compensating for any irregularities that might be experienced during operation of the previous stage. Such irregularities in operation during the first stage may result from gas channelling, imperfect mixing or non-uniform mixtures of active sulfide and carrier gas, non-uniformity of time of contact due to differences in flow rate of the clay over the cross sectional area of the reactor, or other conditions that might be encountered in practical operation.

The described multi-stage treatment, in addition, results in important economies in heating costs and in total sulfiding gas. During the initial heating stages relatively small amounts of sulfide gas may be used, and with the embodiment of Figure 1, quantities of sulfide even less than theoretically required for complete sulfidation can be utilized. The required further reaction can then be easily accomplished with high concentrations of sulfide gas in a comparatively low bulk volume. The sulfiding reaction is apparently endothermic, and it is therefore advantageous to effect at least an appreciable part of the reaction in the presence of the heating gas.

The described process is applicable to the treatment not only of sub-bentonite clay of the type described, but also other iron containing clays including raw or acid-treated montmorillonite and kaolin clays and other finely divided minerals of any origin, provided that the size of the particles is such as to enable the formation of a fluidized mass with the treating gas. The average size of the particles should therefore lie in the range of about 50 to 300 mesh. Although there may be individual variations, the desired low residual iron content can be readily obtained under the conditions given; by the use of volumetric gas rates such that there is furnished a concentration of about 1 to 2% active sulfide by volume of total treating gas in the heating and primary treating section and 25 to 50% sulfide by volume of concentrated treating gas in the secondary or cleanup section. In some instances to obtain the desired low residual iron content more drastic treatment may be required than in the case of the illustrated clay; as by the employment of a longer treating time at the higher temperatures of the range, to about 5 hours, and/or somewhat higher concentrations of sulfide gas in the first stage operation, as up to about 3 to 5% of the total treating gas employed in that stage, or up to about 4 to 6 times the stoichiometric equivalent of the iron content of the clay or other material being sulfided.

Obviously many modifications and variations of the invention as hereinbefore set forth may be made without departing from the spirit and scope thereof and therefore only such limitations should be imposed as are indicated in the appended claims.

We claim as our invention:

1. The process of treating finely divided solid mineral material at elevated temperature with gas reactive with a component of said mineral materials, which comprises continuously feeding said finely divided solid mineral material initially into a primary treating zone to form a layer of said material in said zone, continuously withdrawing solid material from said layer to form a second layer of solid material within said zone, said continuous feeding and withdrawing being continued to provide a plurality of such layers at spaced levels in said zone, introducing into a mixing zone below the lowermost final layer thus formed in said primary treating zone a gas heated to at least maximum desired reaction temperature, further introducing into said mixing zone a concentrated reactive gas in substantially smaller volume than said heated gas, effecting mixing of said concentrated reactive gas with said heated gas in said mixing zone to form a diluted hot treating gas, flowing the diluted hot treating gas into said final layer at a rate sufficient to suspend the solid material in said layer to form a dense turbulent fluidized mass, separating dilute hot treating gas from said final layer and flowing the separated gas to the next higher layer to effect suspension of the solid material in said layer to form a dense turbulent fluidized mass, separating hot dilute treating gas from said last named layer and successively flowing the separated gas in like manner to suspend each succeeding higher layer and finally to the first and highest layer formed by the continuous initial feeding of solid mineral materials and thereafter discharging separated gas from said highest layer; the temperature of said diluted hot treating gas being reduced in flowing successively through the several layers while the temperature of said solid material is increased progressively in descent from said highest layer to said lowermost layer as a result of direct heat exchange in contact between said diluted hot treating gas and said solid material; withdrawing the thus heated and treated solid material from said lowermost layer of said primary treating zone and contacting the withdrawn solid material directly with concentrated reactive gas introduced at a temperature lower than the temperature of said solid material, said concentrated reactive gas being flowed at a rate sufficient to suspend the solid material thus contacted in dense turbulent fluidized condition, separating concentrated reactive gas from contact with said solid material and admitting the separated gas to the aforesaid mixing zone, continuously withdrawing solid material after contact with the concentrated reactive gas, contacting the solid material thus withdrawn with cool inert gas, admixing cool inert gas with reactive gas to form by the admixture said concentrated reactive gas hereinbefore specified, and finally discharging treated solid material in cooled condition.

2. The process of treating finely divided iron-containing clay to convert the iron present therein to iron sulfide, which comprises continuously introducing such finely divided clay into the upper part of a primary treating zone to form a layer of such clay in said zone, flowing into said layer a hot gas with velocity sufficient to suspend the clay in said layer as a dense turbulent fluidized mass, said hot gas being at a temperature higher than that of the clay in said layer and said hot gas containing in low concentration active sulfiding gas, continuing introduction of finely divided clay to said layer to effect continuous overflow of a portion of the clay from said layer, continuously conducting such overflowed portion to a lower level in said primary treating zone to form a second layer at that level, contacting said second layer in similar manner with hot gas to suspend the clay in the hot gas and form a dense turbulent fluidized mass of said second layer, continuously overflowing clay from said second layer to a next lower layer and thus from layer to layer through a plurality of layers at successively lower levels in said primary treating zone, each of the intermediate plurality of layers being formed into a dense turbulent fluidized mass by suspension in hot gas passing upwardly into said layer from a next lower layer, said hot gas entering at a temperature higher than that of the clay contacted thereby in each of such layers, and the lowermost layer of the primary treating zone being suspended by initial contact with hot gas introduced into said layer from a mixing zone therebelow, introducing into said mixing zone hot gas from an external source, said gas being substantially free of water and uncombined oxygen and being at a temperature not less than the desired maximum reaction temperature and in the range of about 1200–1500° F., maintaining a secondary treating zone below said mixing zone, said secondary treating zone being of substantially smaller cross sectional area throughout than the primary treating zone, overflowing finely divided clay from the lowermost layer of such primary treating zone into said secondary treating zone, passing the clay through the secondary treating zone and discharging the treated clay therefrom, introducing relatively cool concentrated sulfiding gas into the bottom of said secondary treating zone at a temperature below that of the clay in said zone, flowing the concentrated sulfiding gas upwardly through said secondary treating zone in contact with the clay in said zone, discharging the gaseous effluent at the top of said secondary treating zone and into said mixing zone for admixture with the hot gas introduced from an external source into said mixing zone, thereby forming hot dilute sulfiding gas constituting the aforesaid gas passed through the several layers of clay in the primary treating zone.

3. The process in accordance with claim 2 wherein the clay is contacted with concentrated sulfiding gas in said secondary treating zone at a velocity effecting suspension of said clay in the gas as a dense turbulent mass.

4. The process in accordance with claim 2 wherein the concentrated sulfiding gas comprises at least 25% by volume of hydrogen sulfide in a substantially inert gaseous carrier, and the rates of flow of the concentrated sulfiding gas and of the said hot gas from an external source into said mixing zone are controlled to provide in the gas admitted into the lowermost layer of clay in said primary treating zone an amount of hydrogen sulfide in excess of the theoretical requirement for complete sulfidation of the iron content of the clay.

5. Process in accordance with claim 2 wherein the hot gas introduced from an external source into said mixing zone is at a temperature sufficiently high and is maintained in contact with said clay during the several treating stages in said primary treating zone for a time sufficient to heat said clay to at least 1200° F.

WALTER L. WEIDMAN.
HUBERT A. SHABAKER.
EDWARD B. CORNELIUS.

REFERENCES CITED

The following references are of record in the file of this patent:

UNITED STATES PATENTS

| Number | Name | Date |
|---|---|---|
| 1,727,441 | Parentani | Sept. 10, 1929 |
| 1,999,773 | McMichael | Apr. 30, 1935 |
| 2,388,302 | Weyl | Nov. 6, 1945 |
| 2,395,198 | Schulze | Feb. 19, 1946 |
| 2,444,990 | Hemminger | July 13, 1948 |
| 2,466,052 | Shabaker et al. | Apr. 5, 1949 |